June 7, 1960 D. G. DENING ET AL 2,939,940
CIGAR LIGHTER AND MOUNTING THEREFOR
Filed July 5, 1957 2 Sheets-Sheet 1
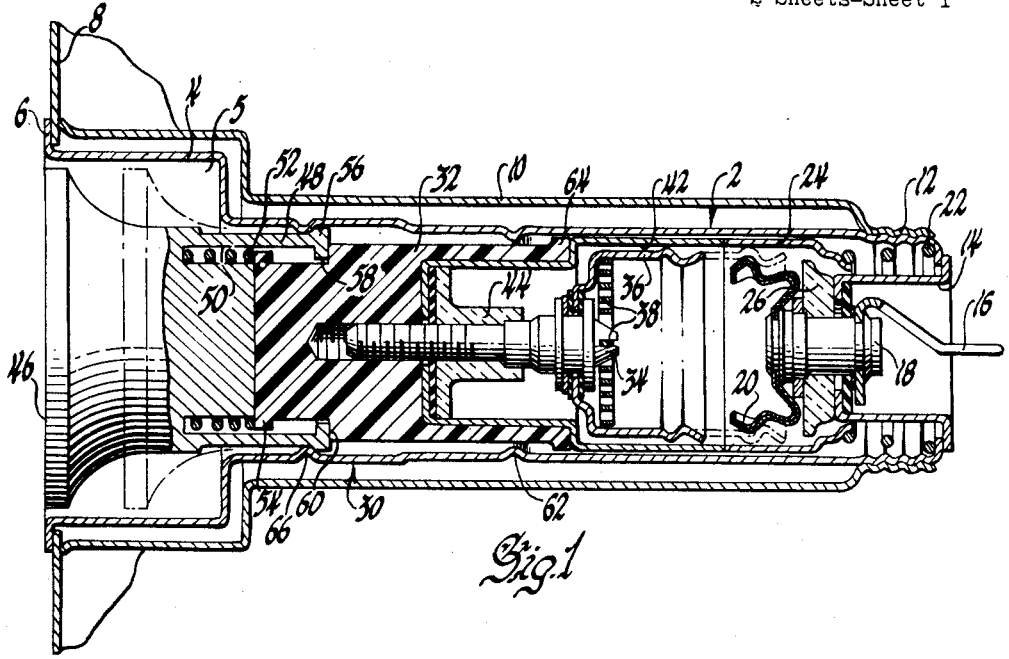
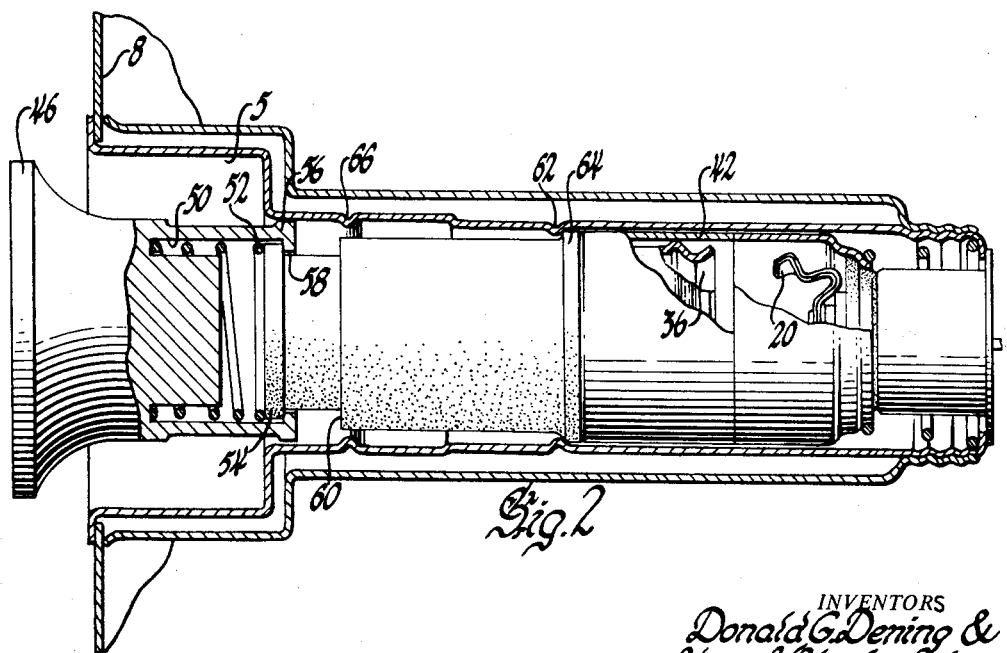
INVENTORS
Donald G. Dening &
BY Homer V. Krautwurst
R. R. Barnard
ATTORNEY

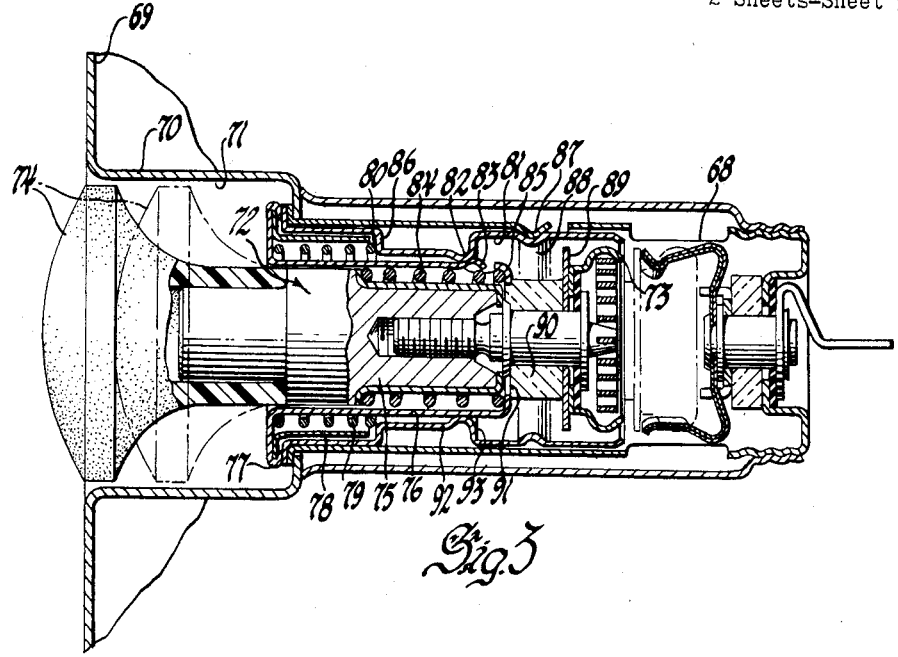
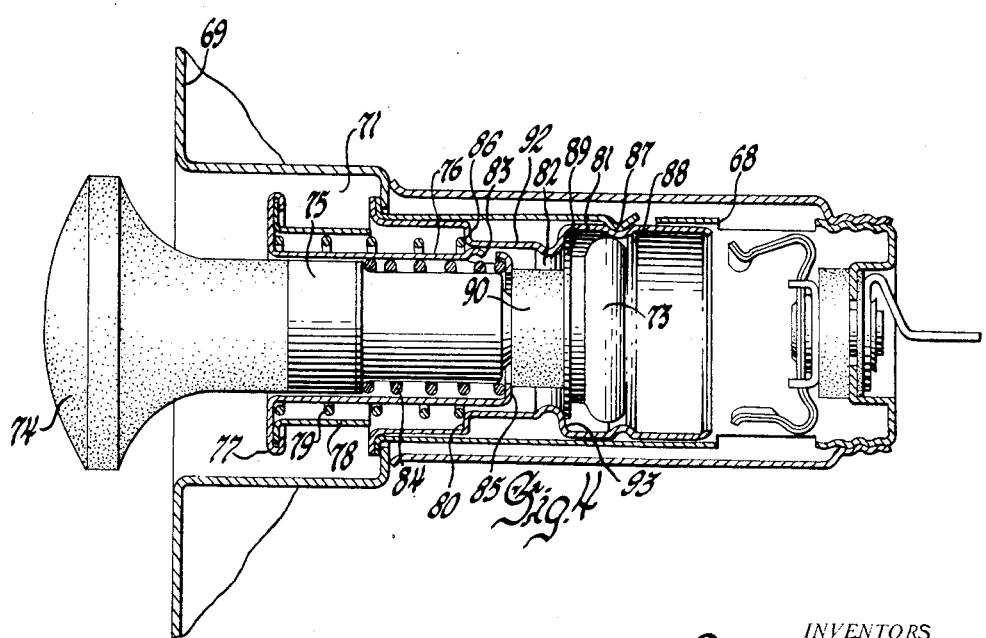

United States Patent Office 2,939,940
Patented June 7, 1960

2,939,940
CIGAR LIGHTER AND MOUNTING THEREFOR

Donald G. Dening and Homer V. Krautwurst, Rochester, N.Y., assignors to General Motors Corporation, Detroit, Mich., a corporation of Delaware Filed July 5, 1957, Ser. No. 670,070

22 Claims. (Cl. 219—32)

The present invention relates to cigar lighters and, in particular, to a means for mounting a cigar lighter assembly in a recessed position with respect to a support panel such as a vehicle dashboard.

Cigar lighter assemblies of the type herein contemplated normally include a substantially cylindrical or tubular holding case having a deep well or cavity into which an igniting unit is removably insertable. The holding case and igniting unit include, respectively, fixed and movable contact latch members which are engageable to energize an igniting circuit from a suitable source of electrical energy through a heating element carried by the igniting unit. One of the contact latch members may be formed of a temperature responsive material to automatically release upon the heating element reaching a predetermined temperature for use. Ejection means normally including a spring then operates to thrust the igniting unit outwardly of the holding case to what may be termed a "holding" position. At this time, the igniting unit handling plug is readily accessible for removal of the igniting unit for use. It should also be noted that in assemblies of the type herein contemplated, the "holding" position aforementioned is also the position in which the igniting unit is normally maintained in the holding case prior to energization of the igniting circuit.

In recent years, the general public has become quite style-conscious with respect to automotive vehicles and, at the same time, extremely interested in the efforts of automotive manufacturers to incorporate as many safety features as possible into their respective vehicles. In the course of their investigation of various safety features for incorporation into their vehicles, automotive manufacturers have observed that many serious accidents result by reason of the vehicle occupants being thrown against protruding instruments or devices mounted on or adjacent the vehicle instrument panel. Accordingly, it is desirable to design the interior of an automotive vehicle to be pleasing in appearance from a styling standpoint, while at the same time incorporating as many safety features therein as possible. In particular, it is deemed desirable to mount various accessory-controlling knobs and, in particular, a cigar lighter in an unobtrusive position in which the danger of injury from striking it may be materially reduced, if not eliminated.

Therefore, pursuant to a general object of this invention, it is intended to provide a lighter assembly and mounting therefor in which the igniting unit handling knob is carried in a relatively recessed position on the dashboard of a vehicle with the igniting unit in the normal "holding" position.

In accordance with another general object of this invention, it is intended to provide a cigar lighter assembly of the type aforementioned which includes a handling knob which is telescopically mounted with respect to the main body portion of the igniting unit whereby, with the latter in the normal "holding" position within the lighter case, the handling knob will be recessed relative to a vehicle instrument panel.

Moreover, according to another feature and object of this invention, the holding case and igniting unit are provided with cooperable locking or detent means by which the main body portion of the igniting unit may be held in the "holding" position with the handling knob recessed even to the extent of being held flush with the instrument panel, the aforementioned ejecting means for placing the igniting unit in condition for use after heating of the element thereof providing the impetus for releasing the locking or detent means engaging the handling knob to permit the latter to be thrust beyond the instrument panel for access by the user.

Referring to a more specific feature and object of this invention, it is intended to provide a lighter igniting unit comprising a handling knob which is axially movable under spring pressure, and cooperable locking or latching means formed on the igniting unit, knob and holding receptacle to normally maintain the handling knob and entire igniting unit in a recessed or even flush position with respect to an exteriorly visible panel through which access may be had to the igniting unit. According to this feature of the invention, the handling knob is automatically projected outwardly from this panel for access by the vehicle operator upon the igniting cycle for the heating element occurring.

These and other features, objects and advantages of this invention will appear more fully hereinafter as the description of the invention proceeds, and in which reference is made to the following drawings in which:

Figure 1 is a cross section of a preferred form of this invention with the igniting unit shown in the normal or holding position in the lighter receptacle;

Figure 2 shows the assembly of Figure 1 after the occurrence of a heating cycle, and with the handling knob accessible for use; and Figures 3 and 4 are similar cross sectional views of another form of this invention.

In Figures 1 and 2, there is shown a preferred form of this invention as incorporated into a cigar lighter assembly of the general type shown in United States Patent No. 2,828,400 issued March 25, 1958 to Clarence H. Jorgensen and Donald G. Dening. Referring specifically to these figures of the drawings, there is shown a cigar lighter assembly comprising a holding case or receptacle 2 having an outwardly flared substantially cylindrical portion 4 terminating in a radially outwardly extending annular flange 6 defining an access opening into the interior of the case and through an aperture in a support panel 8 such as a vehicle instrument panel. The case portion 4 forms a cavity or recess 5 in which the igniting unit handling knob is normally positioned as will appear hereinafter. The outer sleeve 10 may take the same general form or configuration as the holding case 2 and includes a portion 12 for threadably engaging a similarly formed portion on the rearwardly extending end of the holding case 2 for locking the flange 6 of the latter against the support panel 8.

Rigidly secured by any suitable means, such as soldering or the like, to the rearmost end of the holding case 2 is a cylindrical cup or shell member 14 forming in part a housing for the terminal member 16 rigidly secured in an electrical communication with the stud 18 which carries at its opposite end a fixed contact or latch member 20. The latch member 20 may be formed of a bimetallic or other temperature responsive material for a purpose to appear more fully hereinafter. As will appear clearly from the drawings, suitable washers and insulating members are employed to conduct current from a suitable source of electrical energy, such as a vehicle battery, through the terminal member 16 and stud 18 to the fixed latch member 20. An ejector spring 22 is disposed about the cup 14 within the case 2 and engages the end of an ejector cup 24 normally urging it to the left in Figure 1 as limited by engagement of this cup with the annular washer member 26 disposed about the stud 18.

The igniting unit 30 includes a body portion 32 into which there is secured a current conducting stud 34 about the forward end of which a movable contact and latch cup 36 is fixedly mounted. The cup 36 surrounds a heating element or coil 38 one end of which is secured in current-conducting relationship to the cup, while the other end is suitably secured to the forward end of the stud 34 as is the usual practice. A tubular or cylindrical sleeve 42 is rigidly secured to the body portion of the igniting unit by means of the stud 34 and a washer or plug 44. The sleeve 42 has a diameter in relation to that of the holding case 2 so as to be removably insertable in the latter.

The handling knob 46 is formed with an annular skirt 48 enclosing an annular groove 50 in which the relatively light spring 52 is located for abutment with the end of this groove and an annular shoulder 54 formed on the body portion 32 of the igniting unit. The knob skirt 48 terminates in a radially outwardly extending shoulder 56 and a radially inwardly extending shoulder 58, the latter being capable of axial travel between the shoulder 54 and another shoulder 60 on the main body portion of the igniting unit. However, it may be preferable to limit relative axial travel inwardly of the knob 46 with respect to the body portion 32 by mutual engagement of their adjacent central surfaces as shown clearly in Figure 1.

Locking means which may take the form of an annular rib 62 or series of circumferentially spaced depressions formed in the wall of a case 2 provides a means for cooperating with the annular shoulder 64 of the igniting unit body portion to retain the unit in a "holding" position from which the unit may be removed for use after the heating element 38 has been raised to the proper temperature, or for merely holding the unit in the case when not in use. A second detent or locking rib 66 is axially outwardly spaced on the holding case from the locking rib 62. The locking means 66 is adapted for engagement with the aforementioned shoulder 56 on the skirt 48 of the handling knob.

It will be appreciated by those skilled in the art that the fixed and movable contact latching members 20 and 36, respectively, are formed or suitably contoured for latching engagement upon depressing the knob inwardly to the dotted line position in Figure 1. A circuit is then established through the contact members to the heating element. Upon the heating element reaching the predetermined desired temperature, the temperature responsive fixed contact and latch member 20 will deflect inwardly thereby releasing the latch member 36 permitting the ejector cup 24, which heretofore has been moved against spring pressure by the sleeve 42 to latch the mechanism, to eject the igniting unit.

Upon insertion of the igniting unit through the access opening of the panel 8 and into the well or cavity of the holding case, the annular shoulder 64 or perhaps the exterior surface of the sleeve 42 of the igniting unit will frictionally engage the locking mechanism 62 of the holding case thereby resulting in relative travel of the handling knob to the right to depress the spring 52. Alternatively, the spring may be relatively light so as to result in depression after the sleeve 42 abuts ejector cup 24. At this time, the shoulder 56 will ride past the locking means 66 to firmly secure and latch the handling knob 46 axially inwardly of the igniting unit. This position corresponds to the "holding" position at which time, by suitably locating the detent means 66, the handling knob may be maintained in the recess 5 in a preferably flush position with respect to the exterior of support panel 8, as shown in the solid line position of Figure 1.

If it is desired to use the lighter, the knob 46 is depressed to the dotted line position of Figure 1 thereby causing, through the abutment of the shoulder 58 with the shoulder 60 or, preferably, abutment of the central portion of the knob with the adjacent surface of the body portion of the igniting unit, latching of the members 20 and 36, and compression of the ejector spring 22.

Upon heating of the element to a predetermined temperature, the latching members are automatically released and the ejector cup thrusts the igniting unit to the left in Figure 1 as aforementioned. As a result of this movement, the body portion of the igniting unit will move to the left until shoulder 64 is stopped by locking rib 62. Upon release of the ejection spring and thrusting of the igniting unit body to the "holding" position defined by the shoulder 64 and detent means 62, the handling knob shoulder 56 will be forced past the detent means 66 thereby releasing the spring 52 to extend the knob outwardly of the panel 8 as limited by abutting engagement of the skirt shoulder 58 with the shoulder 54 on the body of the igniting unit. Thus, the handling knob is projected outwardly from the support panel and from the recessed cavity 5 in the holding case for access by its intended user as shown in Figure 2.

Referring now to Figures 3 and 4, another form of the invention is shown as incorporated into an igniting unit which also embodies a retractable sleeve which may be manually retracted from an element shielding position to a position exposing the element for the purpose of lighting cigars, pipes and the like. In conjunction with the description of this form of the invention, it is believed to be unnecessary to again describe the basic components of the holding case insofar as it is conventional and corresponds to devices well known in the art and to the embodiment previously described. Therefore, only those portions of the case which cooperate with the igniting unit to achieve the objects of this invention will be referred to specifically.

The holding case 68 is locked as before to a panel 69 which includes a cylindrical portion 70 forming a cavity 71 for the handling knob. Furthermore, the holding case is again provided with temperature responsive automatically releasable latch and contact fingers rigidly secured to a current-conducting post or stud in turn supporting a terminal member in electrical communication with a suitable source of energy such as a vehicle battery.

In this form of the invention, the igniting unit 72 includes a heating element or coil within the cup-shaped contact member 73 and handling knob 74 which are axially spaced on and rigidly secured to a body portion 75. A substantially cylindrical inner sleeve 76 surrounds the body portion of the igniting unit and includes a radially outwardly extending flange 77 to which there is crimped a cylindrical spring shroud 78 under which there lies a spring 79. This spring is seated against the flange 77 and a radially inwardly extending wall portion 80 of an outer retractable sleeve 81 which also includes an inwardly struck rib portion 82 for selective cooperation with a radially outwardly struck portion 83 of the aforementioned sleeve 76. Furthermore, what may be termed an ejection spring 84 is seated between the annular wall 85 at the forward end of the inner sleeve 76 and a shoulder 86 formed on the body portion 75 of the unit.

The holding case 68 includes one or more radially inwardly struck resilient fingers 87 forming a locking means for engagement with an annular depression or rib 88 on the retractable sleeve 81 to maintain the lighter unit in a "holding" position as will appear more fully hereinafter.

An annular washer 89 is fixedly mounted in abutting engagement with the rear wall of the cup 73 and in turn rests against an annular insulating washer 90 of suitable radial extent to abut the radially inwardly extending wall 85 of the sleeve 76 which defines an opening 91 therethrough. An annular depression 92 in the retractable sleeve 81 is provided to be conveniently grasped by the fingers of the lighter user to retract the sleeve to expose the heating element for igniting a pipe, cigar or the like, all of which will appear more fully hereinafter.

With the igniting unit removed from the case, the assembly will be disposed substantially as shown in Figure 4 with the retractable sleeve 81 extending forwardly axially beyond the cup 73 and the heating element, and the locking means 82 and 83 disengaged. Upon initially inserting the unit into the holding case, the rib 88 in the retractable sleeve will engage the locking fingers 87 of the case and the assembly will be disposed as shown in Figure 4. Upon the retractable sleeve reaching this position, further depression of the unit into the case results in relative axial travel between the retractable sleeve 81 and the inner sleeve 76 thereby compressing spring 79 until such time as the finger or struck portion 83 and rib portion 82 engage to retain the knob in the solid line position shown in Figure 3. Of course, the spring 79 will be lighter than spring 84 so as to compress first. In this position, the unit is merely retained in the case and is not contemplated for use.

Thereafter, if it is desired to use the lighter, the knob 74 is manually depressed further into the cavity 71 as shown in dotted lines in Figure 3, thereby causing the contact cup 73 to be shifted axially to the right relative to the retractable sleeve 81 until engagement with the temperature responsive latch and contact member in the case. During this movement, the ejection spring 84 is compressed as the forward portion of the unit body 75 projects through the opening 91 defined by the wall 85 of the inner sleeve. Upon automatic release of the latching contact members, the ejection spring 84 expands thereby causing the insulating plug or washer 90 to abut the annular wall portion 85 of the inner sleeve resulting in disengagement of the locking members 82 and 83 to permit the spring 79 to project the assembly including the inner sleeve and body portion of the unit axially outwardly from the support panel as shown in Figure 4. Relative axial outward movement between the inner and retractable sleeves is limited by abutting engagement of the annular washer 89 with the wall portion 93 of the retractable sleeve adjacent the rib 82. Naturally, similar movement between the main body of the unit and the inner sleeve is limited by engagement as aforementioned between the plug or washer 90 and the wall 85 of the inner sleeve 76.

If it is desired to expose the heating element to light a pipe or cigar which would ordinarily be prohibited by the extension of the retractable sleeve beyond such element, the retractable sleeve may be moved rearwardly to expose the element by grasping the sleeve, for example, in the recessed portion 92. The sleeve may be retained in this retracted position by engagement of the locking means 82 and 83 aforedescribed.

Apart from the inclusion of a retractable sleeve, the second form of the invention has other advantageous features. For example, it will be noted that with the latching contact members engaged, the heating element extends beyond the "hold" position of the retractable sleeve thereby minimizing heating of the latter. However, upon removal of the unit for use, the retractable sleeve is maintained beyond the heating element and cup 73 by spring 79 to form a shield to prevent loose embers from dropping onto the user's clothing or severe burns from occurring by reason of mishandling or dropping of the unit. Moreover, the igniting unit is a compact structure which also houses the ejection spring.

While two specific forms of the invention have been shown for illustrative purposes, it will be apparent that many modifications can be made of these forms by those skilled in the art. Thus, while specific forms of the invention have been shown, they will each be seen to contain an igniting unit, relatively axially mounted handling knob, and cooperable detent or locking means formed on the unit, knob and holding case to retain the unit in a "holding" position with the handling knob recessed or substantially flush with the instrument or other supporting panel. Moreover, in one embodiment, a more or less general type of ejecting means may be employed to automatically release the knob locking means to place the latter in a readily accessible position outwardly of such a panel when it is intended to use the heated unit. Therefore, it is to be understood that it is not intended to limit the invention to the specific forms shown, but only by the scope of the claims which follow.

We claim:

1. A cigar lighter assembly comprising a holding case, an igniting unit removably insertable therein, said igniting unit including a handling knob mounted for relative axial movement within predetermined limits, spring means urging said knob outwardly relative to said unit, means for locking and retaining said knob inwardly of said unit, and cooperating locking means on said case and unit for retaining the latter in a holding position.

2. A cigar lighter assembly comprising a holding case, an igniting unit removably insertable therein, said igniting unit including a handling knob mounted for relative axial movement within predetermined limits, spring means urging said knob outwardly relative to said case, cooperating locking means on said case and unit for retaining the latter in a holding position, engageable latch means carried respectively by said igniting unit and case for establishing an igniting circuit through said unit, said means being automatically disengageable to break the igniting circuit and release said unit upon the latter reaching a predetermined temperature, and additional means on said handling knob for locking and retaining the latter inwardly of said case upon depression of said spring.

3. A cigar lighter assembly comprising a holding case, an igniting unit removably insertable therein, said igniting unit including a handling knob mounted for relative axial movement within predetermined limits, spring means urging said knob outwardly relative to said unit, means for locking and retaining said knob inwardly of said unit, cooperating locking means on said case and unit for retaining the latter in a holding position, engageable latch means carried respectively by said igniting unit and case for establishing an igniting circuit through said element, said means being automatically disengageable to break the igniting circuit and release said unit upon the latter reaching a predetermined temperature, said latch means being normally axially spaced from each other with said unit in said holding position, ejection means including a spring which is compressed as said latch is engaged, said ejection means thrusting said unit to the holding position upon disengagement of said latch means, the thrust of said ejection means automatically releasing said handling knob locking means.

4. A cigar lighter assembly comprising a holding case, an igniting unit removably insertable therein, said igniting unit comprising a substantially tubular sleeve, a heating element mounted radially inwardly of said sleeve, a handling knob mounted on said unit for axial movement relative to said sleeve within predetermined limits, spring means urging said knob outwardly relative to said sleeve, cooperating locking means on said case and sleeve for retaining the unit in a holding position, and locking means formed on said handling knob for locking and retaining the later inwardly of said sleeve upon depression of said spring.

5. A cigar lighter assembly comprising a holding case, an igniting unit removably insertable therein, a handling knob mounted on said unit for relative axial movement within predetermined limits, spring means urging said knob outwardly relative to said unit, cooperating locking means on said case and unit for retaining the latter in a holding position, locking means formed on said handling knob for locking and retaining the latter inwardly of said unit upon depression of said spring, a panel having an access opening therein, means for fixedly mounting said case relative to said panel opening for insertion and removal therethrough of said unit, said knob projecting relatively farther from said panel in the unlocked extended position than when said spring is compressed and said knob is locked.

6. A cigar lighter assembly comprising a holding case, an igniting unit removably insertable therein, said igniting unit comprising a substantially tubular sleeve, a heating element mounted radially inwardly of said sleeve, a handling knob mounted on said unit for axial movement relative to said sleeve within predetermined limits, spring means urging said knob outwardly relative to said sleeve, cooperating locking means on said case and sleeve for retaining the unit in a holding position, engageable latch means carried respectively by said igniting unit and case for establishing an igniting circuit through said element, said means being automatically disengageable to break the igniting circuit and release said unit upon the latter reaching a predetermined temperature, spring means engageable with said sleeve for ejecting said unit to the holding position upon disengagement of said latch means, locking means formed on said handling knob for locking the latter inwardly of said sleeve upon depression of said first-named spring means, said sleeve and knob locking means being spaced relatively to each other whereby ejection of said unit causes release of said knob locking means prior to engagement of said sleeve locking means.

7. In combination, a cigar lighter assembly, a panel having an opening therein for access to said assembly; said assembly comprising a holding case having an open end fixedly mounted relative to said panel for access through said panel opening, an igniting unit removably insertable therein, engageable latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to eject said igniting unit to a holding position within said case for removal for use, cooperating means formed on said case and unit to retain the latter in said holding position, a handling knob relatively axially movably mounted on said unit for extension and retraction relative thereto between predetermined limits, spring means connected to said knob and unit continuously urging relative extension therebetween, additional locking means formed on said knob for locking the latter in a retracted position relative to said unit and panel, said last named locking means being automatically releasable upon ejection of said unit to the holding position, whereby said spring extends said knob axially relative to said unit and panel.

8. In combination, a cigar lighter assembly, a panel having an opening therein for access to said assembly; said assembly comprising a holding case having an open end fixedly mounted relative to said panel for access through said panel opening, an igniting unit removably insertable therein, engageable latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to eject said igniting unit to a holding position within said case for removal for use, cooperating means formed on said case and unit to retain the latter in said holding position, a handling knob relatively axially movably mounted on said unit for extension and retraction relative thereto between predetermined limits, spring means connected to said knob and unit continuously urging relative extension therebetween, additional cooperating locking means formed on said case and said knob for locking the latter in a retracted position relative to said unit and panel, said last named locking means being automatically releasable upon ejection of said unit to the holding position, whereby said spring extends said knob axially relative to said unit and panel.

9. In combination, a cigar lighter assembly, a panel having an opening therein for access to said assembly; said assembly comprising a holding case having an open end fixedly mounted relative to said panel for access through said panel opening, an igniting unit removably insertable therein, engageable latch means carried respectively by said igniting unit and holding the case for establishing an igniting circuit, said means being automatically disengageable to break the igniting circuit and release the igniting unit upon the latter reaching a predetermined temperature, ejecting means operative upon disengagement of said latch means to eject said igniting unit to a holding position within said case for removal for use, cooperating locking means formed on said case and unit to retain the latter in said holding position, a handling knob relatively axially movably mounted on said unit for extension and retraction relative thereto between predetermined limits, spring means connected to said knob and unit continuously urging relative extension therebetween, additional cooperating locking means formed on said case and said knob for locking the latter in a retracted position relative to said unit and panel, said locking means being so spaced relative to each other whereby said last named locking means is automatically released upon ejection of said unit prior to engagement of said first named locking means in the holding position, whereby said spring extends said knob axially relative to said unit and panel.

10. In combination, a cigar lighter assembly, a panel having an opening therein for access to said assembly; said assembly comprising a holding case having an open end fixedly mounted relative to said panel for access through said panel opening, an igniting unit removably insertable therein, engageable latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to eject said igniting unit to a holding position within said case for removal for use, cooperating means formed on said case and unit to retain the latter in said holding position, a handling knob relatively axially movably mounted on said unit for extension and retraction relative thereto between predetermined limits, spring means connected to said knob and unit continuously urging relative extension therebetween, additional cooperating locking means formed on said case and said knob for locking the latter in a retracted position relative to said unit and panel, said last-named locking means being automatically releasable upon ejection of said unit to the holding position, whereby said spring extends said knob axially relative to said unit and panel, said last-named locking means being located on said case whereby said handling knob is relatively closer to said panel in its retracted position than it is in its extended position.

11. A cigar lighter assembly comprising a holding case, an igniting unit removably insertable therein, engageable latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to thrust said igniting unit to a holding position, first locking means formed on said case and engageable with said unit to retain the latter in said holding position, a handling knob relatively axially movably mounted on said unit within predetermined limits, spring means normally urging axial extension of said knob relative to said unit, second locking means formed on said case and engageable with said knob upon depression of the latter inwardly of said unit, a panel having an access opening therein, means for fixedly mounting said case relative to said opening, said second locking means being so positioned on said case whereby said knob is spaced farther axially from said panel with said second locking means disengaged than with said locking means engaged.

12. A cigar lighter assembly comprising a holding case, an igniting unit removably insertable therein, a panel having an opening therein, means for fixedly mounting said case opposite said panel opening for removable insertion therethrough of said igniting unit; said igniting unit comprising a main body portion and a handling knob, said handling knob and main body portion being mounted for relative axial movement therebetween, spring means normally urging relative axial extension therebetween, first locking means formed on said case and engageable with said main body portion for maintaining the latter in a holding position, second locking means formed on said case and engageable with said knob to hold the latter in an axially retracted position relative to said main body portion, said second locking means being so positioned relative to said panel whereby upon being engaged said knob is substantially flush with said panel.

13. A cigar lighter assembly comprising a holding case, an igniting unit removably insertable therein, engageable latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to thrust said igniting unit to a holding position, first locking means formed on said case and engageable with said unit to retain the latter in said holding position, a handling knob relatively axially movably mounted on said unit within predetermined limits, spring means normally urging axial extension of said knob relative to said unit, second locking means formed on said case and engageable with said knob upon depression of the latter inwardly of said unit, a panel having an access opening therein, means for fixedly mounting said case relative to said opening, said second locking means being so positioned on said case whereby said knob is positioned substantially flush with said panel with said second locking means engaged.

14. A cigar lighter assembly comprising a holding case, an igniting unit removably insertable therein, movable and fixed latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to thrust said igniting unit to a holding position, first locking means formed on said case and engageable with said unit to retain the latter in said holding position, a handling knob relatively axially movably mounted on said unit within predetermined limits, spring means normally urging axial extension of said knob relative to said unit, second locking means formed on said case and engageable with said knob upon depression of the latter inwardly of said unit, the axial spacing of said locking means relative to the travel of said unit upon ejection of the latter being such whereby said knob will be thrust past said second locking means prior to engagement of said first locking means.

15. A cigar lighter assembly comprising a holding case, an igniting unit removably insertable therein, said unit comprising a handling knob, an inner sleeve telescoped on said knob, an outer sleeve telescoped on said inner sleeve, spring means normally urging relative extension of said knob, inner and outer sleeves, locking means on said outer sleeve engageable with said case to maintain said unit in a holding position, locking means on said inner sleeve for retaining the latter in a retracted position within said outer sleeve against spring pressure, a support panel having an access opening therein, means for fixedly mounting said case opposite said opening whereby, with said inner sleeve locking means engaged, said handling knob is maintained recessed within said opening.

16. In combination, a cigar lighter assembly comprising a holding case, an igniting unit removably insertable therein, said igniting unit comprising a main body portion including a handling knob and heating element, an inner sleeve surrounding said main body portion for relative axial movement therebetween, an outer sleeve surrounding said inner sleeve for axial movement relative to the latter and said heating element to a position beyond and to a position substantially exposing said heating element, spring means urging movement of said outer sleeve beyond said heating element, additional spring means urging movement of said main body portion relative to said inner sleeve in a direction opposite to the aforementioned spring urged movement of said outer sleeve, locking means formed on said outer sleeve and engageable with said case to retain the former in a holding position within said case, locking means formed on said inner sleeve to retain it inwardly of said outer sleeve, a support panel having an access opening therein, means for fixedly mounting said case opposite said opening whereby, with said inner sleeve locking means engaged, said handling knob is maintained substantially within said opening.

17. A cigar lighter assembly comprising a holding case, an igniting unit removably insertable therein, said unit comprising a main body portion including a handling knob and heating element, an inner sleeve surrounding said main body portion and relatively axially movable therewith, ejection spring means operatively connected between said main body portion and said inner sleeve, stop means carried by said main body portion and engageable with said inner sleeve to limit axial movement of the former outwardly relative to the latter, a retractable sleeve surrounding said inner sleeve, additional spring means operatively connected between said inner sleeve and said retractable sleeve normally urging relative axial movement therebetween between predetermined limits, said limits defining positions for said retractable sleeve whereby it may extend beyond said element and expose said element, first locking means formed on said retractable sleeve and engageable with said inner sleeve to retain the former in a retracted position substantially exposing said heating element, second locking means formed on said case and engageable with said retractable sleeve to maintain the latter in a holding position, means including engageable latch members carried respectively by said case and unit for establishing an igniting circuit through said element upon axial inward movement of said main body portion relative to said inner sleeve to compress said ejection spring, said latch members being automatically releasable to permit said ejecting spring to thrust said main body portion axially outwardly relative to said inner sleeve until abutment therewith of said stop means, the force of said abutment automatically releasing said first locking means thereby permitting said additional spring means to move said inner sleeve and main body portion axially outwardly relative to said retractable sleeve.

18. A cigar lighter assembly comprising a holding case, an igniting unit removably insertable therein, said unit comprising a main body portion including a handling knob and a heating element, an inner sleeve surrounding said main body portion and relatively axially movable therewith, ejection spring means operatively connected between said main body portion and said inner sleeve, first stop means carried by said main body portion and engageable with said inner sleeve to limit axial movement of the former outwardly of said sleeve in response to said ejection spring, a retractable sleeve surrounding said inner sleeve, additional spring means operatively connected between said inner sleeve and said retractable sleeve normally urging relative axial movement therebetween, additional stop means formed on said main body portion and engageable with said retractable sleeve to limit movement thereof to a position beyond said heating element, first locking means formed on said retractable sleeve and said inner sleeve to retain the latter inwardly of the former, second locking means formed on said case and engageable with said retractable sleeve to maintain the latter in a holding position, means including engageable latch members carried respectively by said case and unit for establishing an igniting circuit through said element upon axial inward movement of said main body portion relative to said inner sleeve to compress said ejection spring, said latch members being automatically releasable to permit said ejection spring to thrust said main body portion axially outwardly relative to said inner sleeve until abutment therewith of said first stop means, the force of said abutment automatically releasing said first locking means thereby permitting said additional spring means to move said inner sleeve and main body portion axially outwardly relative to said retractable sleeve.

19. In combination, a cigar lighter assembly comprising a holding case, an igniting unit removably insertable therein, said unit comprising a main body portion including a handling knob and heating element, an inner sleeve surrounding said main body portion and relatively axially movable therewith, ejection spring means operatively connected between said main body portion and said inner sleeve, stop means carried by said main body portion and engageable with said inner sleeve to limit axial movement of the former outwardly of said sleeve in response to said ejection spring, a retractable sleeve surrounding said inner sleeve, additional spring means operatively connected between said inner sleeve and said retractable sleeve normally urging said retractable sleeve beyond said heating element, first locking means formed on said retractable sleeve and engageable with said inner sleeve to retain the former in a retracted position substantially exposing said heating element, second locking means formed on said case and engageable with said retractable sleeve to maintain the latter in a holding position, means including engageable latch members carried respectively by said case and unit for establishing an igniting circuit through said element upon axial inward movement of said main body portion relative to said inner sleeve to compress said ejection spring, said latch members being automatically releasable to permit said ejecting spring to thrust said main body portion axially outwardly relative to said inner sleeve until abutment therewith of said stop means, the force of said abutment automatically releasing said first locking means thereby permitting said additional spring means to move said inner sleeve and main body portion axially outwardly relative to said retractable sleeve, a support panel having an access opening therein, means for fixedly mounting said case for access through said panel opening, said first named locking means normally being engaged to retain said handling knob substantially within said panel opening whereby, upon automatic release of said latch members and expansion of said ejection spring, said first locking means is released to project said knob axially outwardly of said panel.

20. In combination, a cigar lighter assembly comprising a holding case, an igniting unit removably insertable therein, said unit comprising a main body portion including a handling knob and a heating element, an inner sleeve surrounding said main body portion and relatively axially movable therewith, ejection spring means operatively connected between said main body portion and said inner sleeve, first stop means carried by said main body portion and engageable with said inner sleeve to limit axial movement of the former outwardly relative to the latter in response to said ejection spring, a retractable sleeve surrounding said inner sleeve, additional spring means operatively connected between said inner sleeve and said retractable sleeve normally urging relative axial movement therebetween, additional stop means formed on said main body portion and engageable with said retractable sleeve to limit movement thereof to a position beyond said heating element, first locking means formed on said retractable sleeve and engageable with said inner sleeve to retain the latter inwardly of the former, second locking means formed on said case and engageable with said retractable sleeve to maintain the latter in a holding position, means including automatically releasable latch members carried respectively by said case and unit for establishing an igniting circuit through said element upon axial inward movement of said main body portion relative to said inner sleeve to compress said ejection spring, said latch members being automatically releasable to permit said ejection spring to thrust said main body portion axially outwardly relative to said inner sleeve until abutment therewith of said first stop means, the force of said abutment automatically releasing said first locking means thereby permitting said additional spring means to move said inner sleeve and main body portion axially outwardly relative to said retractable sleeve, a support panel having an access opening therein, means for fixing mounting said case for access through said panel opening, said first named locking means normally being engaged to retain said handling knob substantially within said panel opening whereby, upon automatic release of said latch members and expansion of said ejection spring, said first locking means is released to project said knob axially outwardly of said panel.

21. A cigar lighter assembly comprising a holding case, an igniting unit removably insertable thereof, said unit comprising a handling knob, an inner sleeve telescoped on said knob, an outer sleeve telescoped on said inner sleeve, spring means normally urging relative extension of said knob, inner and outer sleeves, locking means on said outer sleeve engageable with said case to maintain said unit in a holding position, and locking means on said inner sleeve for retaining the latter in a retracted position within said outer sleeve against the pressure of said spring means.

22. A cigar lighter assembly comprising a holding case, an igniting unit removably insertable therein, said igniting unit comprising a main body portion including a handling knob and heating element, an inner sleeve surrounding said main body portion for relative axial movement therebetween, an outer sleeve surrounding said inner sleeve for axial movement relative to the latter and said heating element to a position beyond and to a position substantially exposing said heating element, spring means urging movement of said outer sleeve beyond said heating element, additional spring means urging movement of said main body portion relative to said inner sleeve in a direction opposite to the aforementioned spring-urged movement of said outer sleeve, locking means formed on said outer sleeve and engageable with said case to retain the former in a holding position within said case, and locking means formed on said inner sleeve to retain it inwardly of said outer sleeve.

References Cited in the file of this patent

UNITED STATES PATENTS

| | | |
|---|---|---|
| 1,940,463 | Rintels | Dec. 19, 1933 |
| 1,947,282 | Theis | Feb. 13, 1934 |
| 2,267,011 | Ashton | Dec. 20, 1941 |
| 2,267,592 | Kline | Dec. 20, 1941 |
| 2,292,918 | Ashton | Aug. 11, 1942 |
| 2,531,901 | Ashton | Nov. 28, 1950 |
| 2,652,477 | Johnson | Sept. 15, 1953 |
| 2,730,605 | Johnson | Jan. 10, 1956 |
| 2,828,400 | Jorgensen et al. | Mar. 25, 1958 |